US008589325B2

(12) United States Patent
Chen et al.

(10) Patent No.: US 8,589,325 B2
(45) Date of Patent: Nov. 19, 2013

(54) COMPUTER FOR ARRANGING HIBERNATION SCHEDULES USING RECORDED USER BEHAVIOR DATA COMPARED TO A THRESHOLD

(75) Inventors: Ke-An Chen, Taipei Hsien (TW); Po-Chih Lin, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 966 days.

(21) Appl. No.: 12/461,220

(22) Filed: Aug. 5, 2009

(65) Prior Publication Data

US 2010/0192151 A1 Jul. 29, 2010

(30) Foreign Application Priority Data

Jan. 23, 2009 (TW) .............................. 98102781 A

(51) Int. Cl.
*G06F 17/00* (2006.01)
*G06F 1/26* (2006.01)
*G06F 1/32* (2006.01)
*G06F 1/00* (2006.01)
*G06N 5/02* (2006.01)
*G05D 3/12* (2006.01)
*G05D 5/00* (2006.01)
*G05D 9/00* (2006.01)
*G05D 11/00* (2006.01)
*G05D 17/00* (2006.01)

(52) U.S. Cl.
USPC ............. 706/47; 713/320; 713/321; 713/324; 700/291

(58) Field of Classification Search
None
See application file for complete search history.

(56) References Cited

U.S. PATENT DOCUMENTS

| 5,954,820 | A  | * | 9/1999  | Hetzler ........................ 713/323 |
| 6,330,069 | B1 |   | 12/2001 | Kim |
| 6,654,895 | B1 | * | 11/2003 | Henkhaus et al. ............ 713/320 |
| 7,861,099 | B2 | * | 12/2010 | Theocharous et al. ........ 713/300 |
| 2003/0101009 | A1 | * | 5/2003 | Seem ............................. 702/61 |

FOREIGN PATENT DOCUMENTS

CN 1209593 A 3/1999

OTHER PUBLICATIONS

Simunic, T.; Benini, L.; Glynn, P.; De Micheli, G.; , "Event-driven power management," Computer-Aided Design of Integrated Circuits and Systems, IEEE Transactions on , vol. 20, No. 7, pp. 840-857, Jul. 2001.*
C.-H Hwang and A. C.-H. Wu. A predictive system shutdown method for energy saving of event-driven computation. ACM Trans. on Design Automation of Electronic Systems, 5(2):226-241, Apr. 2000.*
Benini, L.; Bogliolo, A.; De Micheli, G.; , "A survey of design techniques for system-level dynamic power management," Very Large Scale Integration (VLSI) Systems, IEEE Transactions on , vol. 8, No. 3, pp. 299-316, Jun. 2000.*
Srivastava, M.B.; Chandrakasan, A.P.; Brodersen, R.W.; , "Predictive system shutdown and other architectural techniques for energy efficient programmable computation," Very Large Scale Integration (VLSI) Systems, IEEE Transactions on , vol. 4, No. 1, pp. 42-55, Mar. 1996.*

* cited by examiner

*Primary Examiner* — Kakali Chaki
*Assistant Examiner* — Daniel Pellett
(74) *Attorney, Agent, or Firm* — Bacon & Thomas, PLLC

(57) ABSTRACT

A method for arranging schedules and a computer using the method are disclosed. The method comprises the steps of: recording a user behavior record in a predetermined time interval; filtering the user behavior record to generate an effective user behavior record; and generating a schedule according to the effective user behavior record.

7 Claims, 7 Drawing Sheets

|       | Mon | Tue | Wed | Thu | Fri | Sat | Sun |
|-------|-----|-----|-----|-----|-----|-----|-----|
| $D_4$ |     |     |     |     |     |     |     |
| $D_3$ |     |     |     |     |     |     |     |
| $D_2$ |     |     |     |     |     |     |     |
| $D_1$ |     |     |     |     |     |     |     |
|       |     |     |     |     |     |     |     |

Fig.3

COMPUTER FOR ARRANGING HIBERNATION SCHEDULES USING RECORDED USER BEHAVIOR DATA COMPARED TO A THRESHOLD

BACKGROUND OF THE INVENTION

1. Field of the Invention

The present invention relates to a method for arranging schedules and a computer using the same; more particularly, the present invention relates to a method and computer capable of automatically generating a schedule according to a user behavior record.

2. Description of the Related Art

A server is mainly used for providing a computer with data access processes and service request processes. Because a service request may be generated at any time, the server needs to stay on all the time in order to respond to a user's service request.

Nowadays, with the popularity of personal computers, it is common that there is more than one computer in one family. Therefore, the concept of arranging a home/personal server used for managing computers gradually becomes popular.

User behaviors of the home/personal server are simpler than that of a general server. Most of the time, there is no user service request for the home/personal server case. Therefore, if the management mechanism of the general server is applied to the home/personal server, the home/personal server needs to stay in a standby mode all the time, which may result in waste such as power consumption or hardware wastage.

Further, the threshold of the equipment efficiency requirement for the home/personal server is at a relatively lower level than that for the general server. Therefore, if the home/personal server is processing both a system task, such as a data backup procedure, and a user request service, the system will be very busy, such that longer processing time and system burden might be caused, and the user will obviously notice the lowered efficiency.

In a known prior art, a system task schedule of a server is usually predetermined by the server or defined by a user. However, a time conflict between the server-predetermined schedule and the user-defined schedule may possibly occur, such that the efficiency will be lowered, and the user-defined schedule will cause trouble and burdens to the user, therefore there is always a need to rearrange the schedule.

Therefore, there is a need to provide a method for arranging schedules and a computer using the same to mitigate and/or obviate the aforementioned problems.

SUMMARY OF THE INVENTION

It is an object of the present invention to provide a method for arranging schedules and computer using the same. Without interfering in a situation in which a user is using a computer, the present invention can automatically generate a schedule according to a user behavior record, so as to achieve an object of saving resources by means of executing a hibernating procedure or a shutdown procedure.

To achieve the aforementioned object, the present invention provides a method for arranging schedules, which is used in a computer. The method for arranging schedules of the present invention comprises the steps of: recording a user behavior record in a predetermined time interval; filtering the user behavior record to generate an effective user behavior record; and generating a schedule according to the effective user behavior record.

In one embodiment of the present invention, the method for arranging schedules of the present invention further comprises the steps of providing a filtering rule and converting the user behavior record to the effective user behavior record according to the filtering rule.

To achieve the aforementioned object, the present invention further provides a computer, which comprises a processor and a storage device. The storage device is electronically connected to the processor. The storage device comprises a data recording module, a data analysis module and a scheduling module. The data recording module is used for recording a user behavior record; the data analysis module is used for analyzing the user behavior record to generate a schedule; and the scheduling module is used for executing the schedule.

In one embodiment of the present invention, the data analysis module further comprises a data filtering module. The data filtering module has a filtering rule, and the data filtering module is used for filtering the user behavior record to generate an effective user behavior record according to the filtering rule. Accordingly, the data analysis module analyzes the effective user behavior record to generate the schedule.

Other objects, advantages, and novel features of the invention will become more apparent from the following detailed description when taken in conjunction with the accompanying drawings.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views:

FIG. 3 illustrates a schematic drawing of a user behavior record according to one preferred embodiment of the present invention.

DETAILED DESCRIPTION OF THE PREFERRED EMBODIMENT

Figure 1:
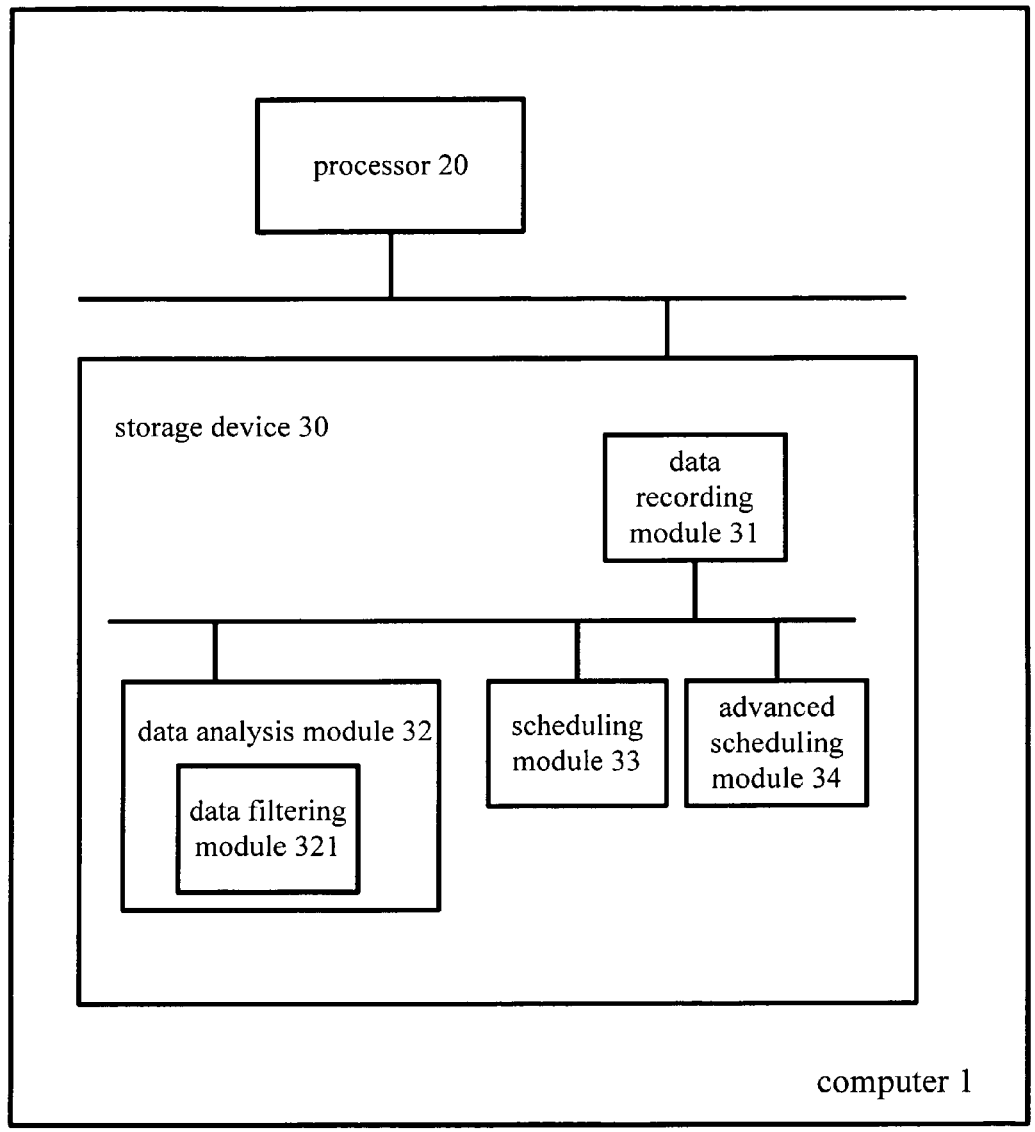
FIG. 1 illustrates a hardware architecture of a computer according to one preferred embodiment of the present invention.

Please refer to FIG. 1, which illustrates a hardware architecture of a computer according to one preferred embodiment of the present invention.

As shown in FIG. 1, the computer 1 of the present invention comprises a processor 20 and a storage device 30. The storage device 30 comprises a data recording module 31, a data analysis module 32, a scheduling module 33, and an advanced scheduling module 34. The data analysis module 32 further comprises a data filtering module 321.

The storage device 30 is electronically connected to the processor 20, such that the processor 20 can execute operations of the data recording module 31, the data analysis module 32, the scheduling module 33, and the advanced scheduling module 34. The data filtering module 321 is used for filtering a user behavior record to generate an effective user behavior record according to a filtering rule. The data analysis module 32 is used for analyzing the effective user behavior record to generate a schedule. The scheduling module 33 is used for executing the schedule.

The process of how the present invention generates the schedule via the data recording module 31, the data analysis module 32, the scheduling module 33, and the advanced scheduling module 34 will be described hereinafter.

Figure 2:
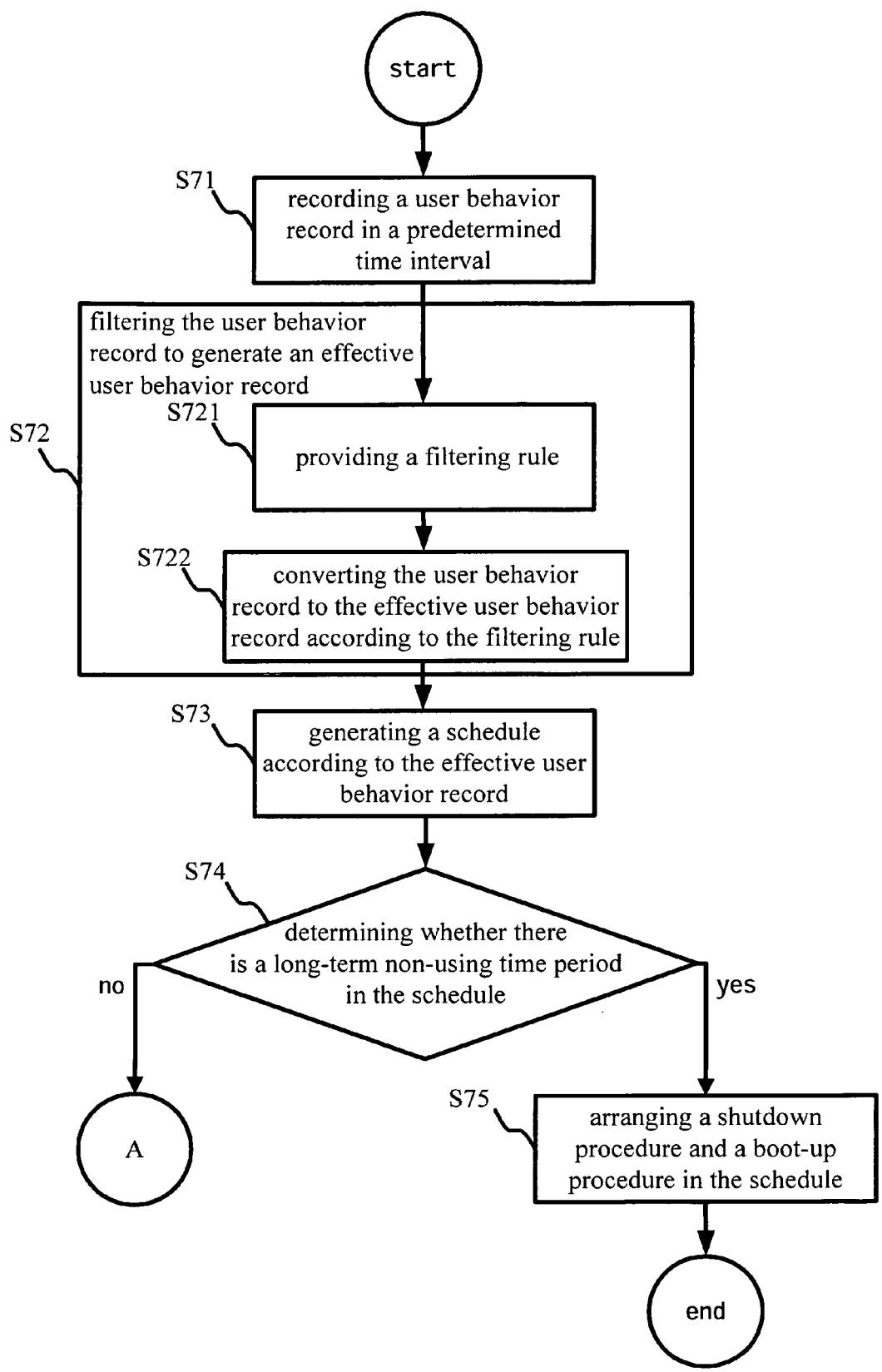
FIG. 2 is a flowchart of a method for arranging schedules according to one preferred embodiment of the present invention.

Please refer to FIG. 2, which is a flowchart of a method for arranging schedules according to one preferred embodiment of the present invention. And please also refer to FIG. 1 and FIGS. 3~7.

As shown in FIG. 2, the present invention firstly performs step S71: recording a user behavior record in a predetermined time interval.

Generally, the computer 1 is provided for being used by a plurality of users. In one preferred embodiment of the present invention, the data recording module 31 is used for recording each user behavior record in the predetermined time interval. The user behavior record may include login time, used computer program types, and using time of each user when the user is using the computer 1. The predetermined time interval is N weeks. The method for arranging schedules of the present invention records the user behavior record within last N weeks. N is substantially between 1 and 24. In one preferred embodiment, N is 4. However, please note that the scope of the present invention is not limited to the above description.

Please note that the method for arranging schedules of the present invention will delete the user behavior record of the earliest week when the user behavior record of the latest week is going to be recorded. Please also note that the scope of the present invention is not limited to the above description.

Then the present invention performs step S72: filtering the user behavior record to generate an effective user behavior record.

In one preferred embodiment of the present invention, step S72 further comprises step S721 and step S722:

Step S721: providing a filtering rule.

In one preferred embodiment of the present invention, the filtering rule is defined with a plurality of sets, wherein each set comprises the same day of each week, and each set comprises each set record. The filtering rule is further defined with a plurality of time periods, which is formed by dividing a whole day by a specific number of hours, where each time period comprises each time period record. In one preferred embodiment of the present invention, the specific number of hours is substantially between 1 and 6. However, please note that the scope of the present invention is not limited to the above description.

Figure 3:
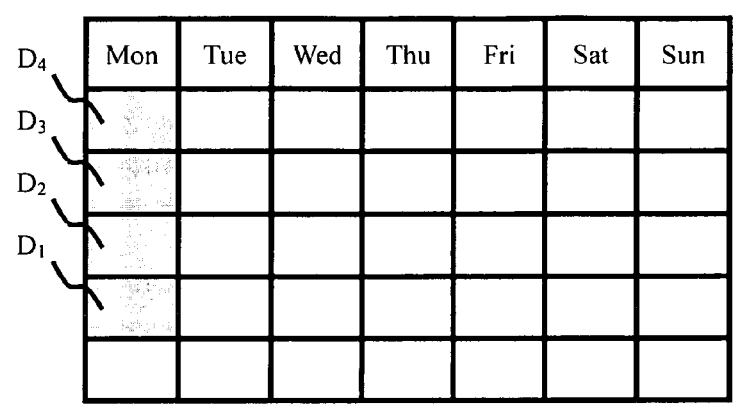

As shown in FIG. 3, in one preferred embodiment of the present invention, the data recording module 31 is used for recording the user behavior record within last 4 weeks. The Monday of each week is grouped as one set. $D_1$ is the set record of the Monday of the most recent 1 week, $D_2$ is the set record of the Monday of the most recent 2 weeks, $D_3$ is the set record of the Monday of the most recent 3 weeks, $D_4$ is the set record of the Monday of the most recent 4 weeks, and so on.

Figure 4:
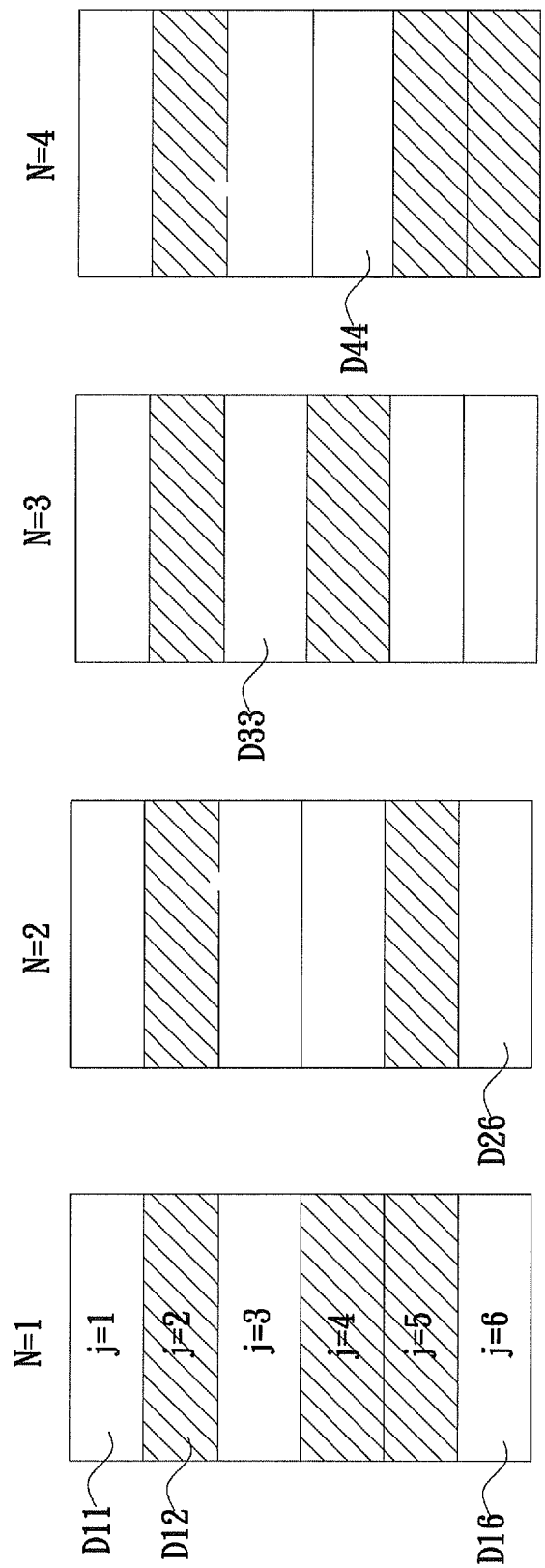
FIG. 4 illustrates a schematic drawing of an effective user behavior record according to one preferred embodiment of the present invention.

As shown in FIG. 4, the specific number of hours is 4. Therefore, a whole day is divided into 6 time periods. The specific number of hours can be 1 so as to divide a whole day into 24 time periods; or, the specific number of hours can be 2 so as to divide a whole day into 12 time periods. Please note that the scope of the present invention is not limited to the above description. $D_{11}$ is the time period record of a first time period of the Monday of the most recent 1 week, $D_{12}$ is the time period record of a second time period of the Monday of the most recent 1 week, and so on. Although in the method for arranging schedules of the present invention, Monday is used as the preferred embodiment, please note that the implementation of the present invention is not limited to Mondays.

Then the present invention performs step S722: converting the user behavior record to the effective user behavior record according to the filtering rule.

In one preferred embodiment of the present invention, the filtering rule further comprises a computer program execution record, a computer usage record or a specific program execution record for the computer 1. For example, the computer program execution is a build-in system program execution record of the computer 1, such as the execution record of a defragmentation program. The computer usage record is a usage record of a specific user (such as an administrator) when s/he uses the computer 1. The specific program can be Outlook or Word. However, the implementation of the present invention is not limited to the abovementioned examples.

In one preferred embodiment of the present invention, the data filtering module 321 is used for converting the user behavior record into the effective user behavior record according to the filtering rule. For example, when one of the time periods of the computer has been used, and the time period meets the filtering rule, the time period record will be defined as effective (illustrated as shaded regions in FIG. 4).

Then, the present invention performs step S73: generating a schedule according to the effective user behavior record.

In one preferred embodiment of the present invention, the data analysis module 32 is used for analyzing the effective user behavior record to generate the schedule. The schedule arranges the computer 1 to execute, but is not limited to, a computer program execution procedure, a boot-up procedure, a hibernating procedure or a shutdown procedure during each time period. By means of arranging the hibernating procedure or the shutdown procedure, the object of saving resources (such as power resources) can be achieved.

Figure 5:
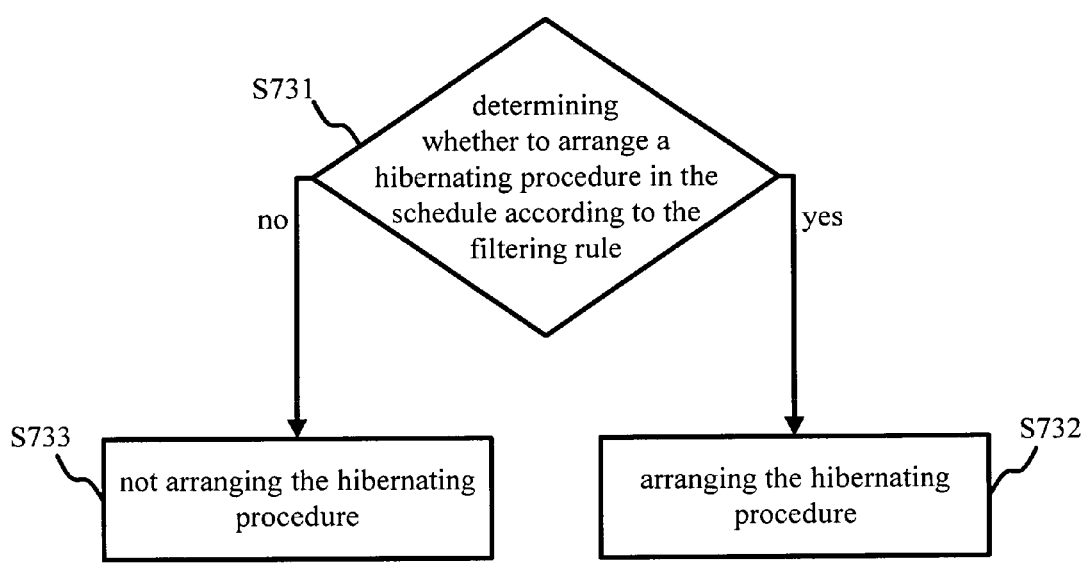
FIG. 5 is a flowchart of the method for arranging schedules according to the preferred embodiment of the present invention.

Please refer to FIG. 5. In one preferred embodiment of the present invention, step S731 is used for determining whether to arrange a hibernating procedure in the schedule according to following rules:

In one preferred embodiment of the present invention, step S731 determines whether to arrange the hibernating procedure in the schedule according to a first rule (1).

$$\sum_{i=1}^{i=N} D_{ij} > K_1 \qquad (1)$$

wherein N is the number of weeks, i is a serial number of one day of one set; j is a serial number of the time period, $D_{ij}$ is a usage state parameter of the computer 1, and $K_1$ is a first constant. Accordingly, if $D_{ij} > K_1$, the hibernating procedure will not be arranged in the schedule (S733); if $D_{ij} < K_1$, the hibernating procedure will be arranged in the schedule (S732).

In one preferred embodiment of the present invention, N is 4, i is 1~4, and j is 1~6. If one time period record is effective, then $D_{ij}=1$; if one time period record is not effective, then $D_{ij}=0$.

In one preferred embodiment of the present invention, step S731 determines whether to arrange the hibernating procedure in the schedule according to a second rule (2).

$$\sum_{i=1}^{i=N} D_{ij} * Wi > K_2 \qquad (2)$$

The major difference between the first rule (1) and the second rule (2) is that $K_2$ is a second constant, and $W_i$ is a weighted value. $K_2$ is larger when one set is closer to the present time because one set will have a higher relevance when it is closer to the present time, which means that the set can meet the latest user behavior more closely.

Figure 6:
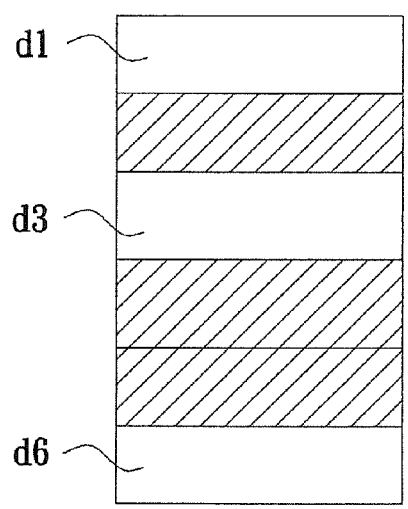
FIG. 6 illustrates a schematic drawing of a schedule according to one preferred embodiment of the present invention.

Please refer to FIG. 6, which illustrates a schematic drawing of a schedule generated by the method for arranging schedules of the present invention, wherein the hibernating procedure is arranged in the time periods of d1, d3 and d6.

Then the present invention performs step S74: determining whether there is a long-term non-using time period in the schedule.

In one preferred embodiment of the present invention, the advanced scheduling module 34 is used for analyzing the generated schedule. In FIG. 4, for example, the long-term non-using time period implies, but is not limited to, that the computer 1 has been idle for more than 8 hours.

If yes, the present invention then performs step S75: arranging a shutdown procedure and a boot-up procedure in the schedule.

In one preferred embodiment of the present invention, the advanced scheduling module 34 arranges the shutdown procedure and the boot-up procedure in the schedule so as to achieve the object of saving resources.

If no, the present invention then performs step S76: determining whether there is a computer program execution procedure.

Figure 7:
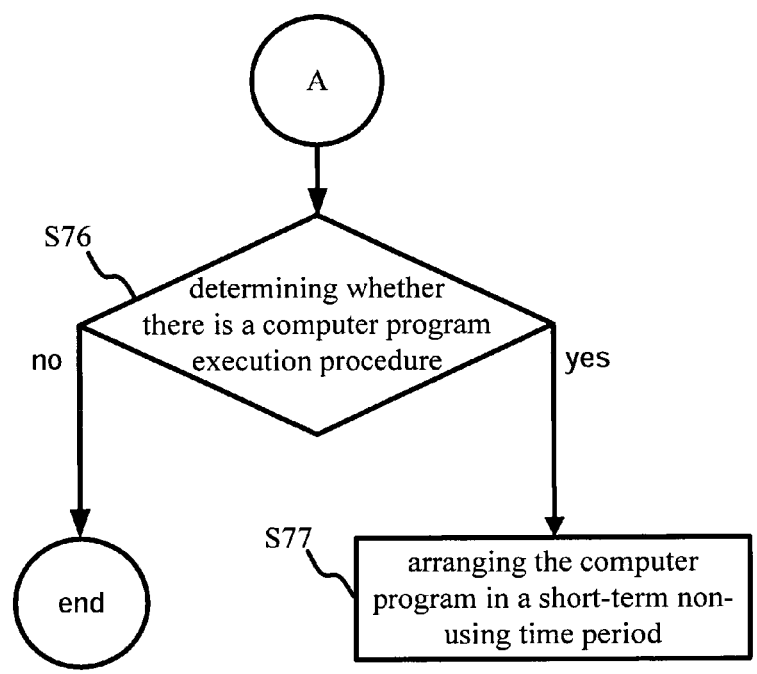
FIG. 7 is a flowchart of the method for arranging schedules according to the preferred embodiment of the present invention.

As shown in FIG. 7, in one preferred embodiment of the present invention, the advanced scheduling module 34 is used for determining whether there is a computer program execution procedure (such as a defragmentation program).

If yes, the present invention then performs step S77: arranging the computer program in a short-term non-using time period.

In one preferred embodiment of the present invention, the advanced scheduling module 34 can move the computer program execution procedure to other short-term non-using time period, and re-generate a schedule. Therefore, the spare time period can be arranged with the hibernating procedure or the shutdown procedure, so as to achieve the objective of saving resources.

Please note that the method for arranging schedules of the present invention is not limited to be used in a computer. For example, the method for arranging schedules of the present invention can also be used in a server or other equivalent apparatus.

Although the present invention has been explained in relation to its preferred embodiments, it is to be understood that many other possible modifications and variations can be made without departing from the spirit and scope of the invention as hereinafter claimed.

What is claimed is:

1. A computer, comprising:
a processor, and
a storage device, electronically connected to the processor, the storage device comprising:
a data recording module, used for recording a user behavior record in a predetermined time interval on a single day in each of N consecutive weeks, wherein N is greater than one;
a data analysis module, used for analyzing the user behavior record to generate a schedule and determining whether to arrange a hibernating procedure in the schedule according to a first or second rule, wherein the data analysis module further comprises:
a data filtering module, used for filtering the user behavior record to generate an effective user behavior record according to a filtering rule, and the data analysis module analyzes the effective user behavior record to generate the schedule, wherein the first rule is:

$$\sum_{i=1}^{i=N} D_{ij} > K_1;$$

and the second rule is:

$$\sum_{i=1}^{i=N} D_{ij} * Wi > K_2;$$

wherein N is the number of weeks and greater than one, i is a serial number of one set, each set comprises a plurality of days and each of the plurality of days comprises the same day of each of the N weeks, j is a serial number of one of a plurality of time periods, $D_{ij}$ is a usage state parameter of the computer, $W_i$ is a weighted value, $K_1$ is a first constant, and $K_2$ is a second constant;
if $$\sum_{i=1}^{i=N} D_{ij} > K_1 \text{ or } \sum_{i=1}^{i=N} D_{ij} * W_i > K_2,$$

the hibernating procedure will not be arranged in the schedule; and
if $$\sum_{i=1}^{i=N} D_{ij} < K_1 \text{ or } \sum_{i=1}^{i=N} D_{ij} * W_i < K_2,$$

hibernating procedure will be arranged in the schedule; and a scheduling module, used for executing the schedule.

2. The computer as claimed in claim 1, wherein the predetermined time interval is last N weeks.

3. The computer as claimed in claim 1, wherein the filtering rule is defined with a plurality of sets, where each set comprises the same day of each week, and each set comprises each set record.

4. The computer as claimed in claim 3, wherein the filtering rule is defined with a plurality of time periods, which is formed by dividing a whole day by a specific number of hours, where each time period comprises each time period record.

5. The computer as claimed in claim 4, wherein the schedule arranges the computer to execute a computer program execution procedure, a boot-up procedure, a hibernating procedure, or a shutdown procedure during each time period record.

6. The computer as claimed in claim 1, wherein the filtering rule comprises a computer program execution record, a computer usage record, or a specific program execution record to the computer.

7. The computer as claimed in claim 1, wherein the storage device further comprises an advanced scheduling module electronically connected to the processor, where the advanced scheduling module is used for analyzing and generating the schedule.

\* \* \* \* \*